W. A. SAPP.
DIRIGIBLE LIGHT SUPPORT.
APPLICATION FILED SEPT. 7, 1911.
1,029,514.
Patented June 11, 1912.
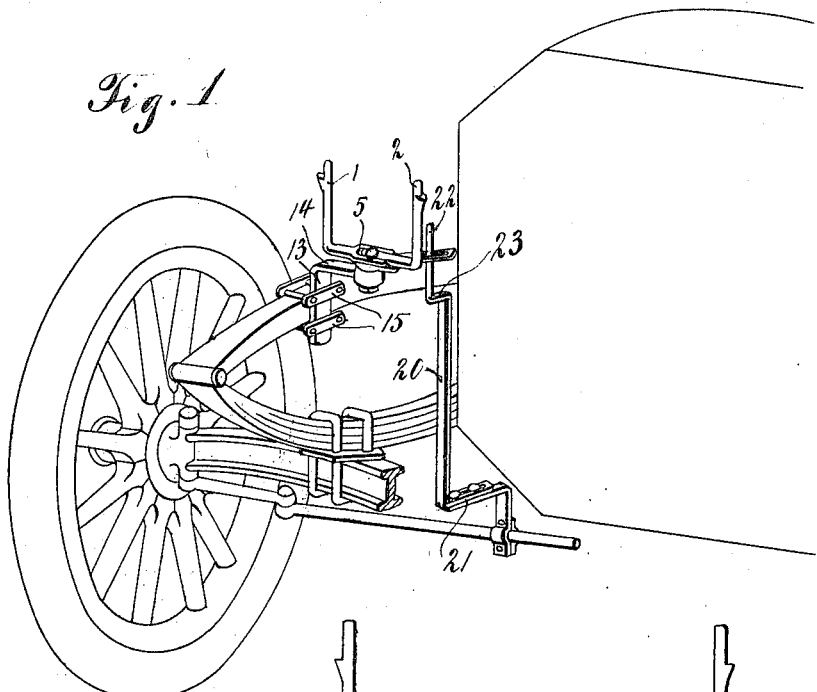
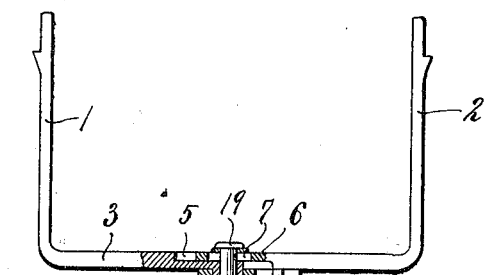
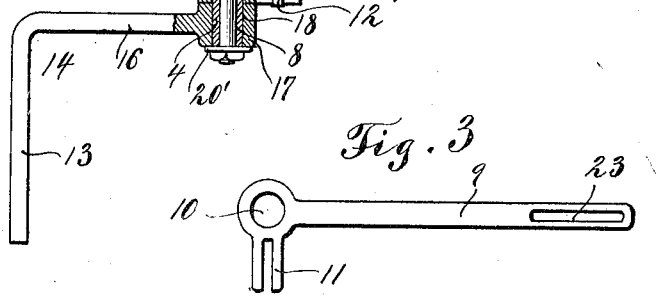
WITNESSES:
INVENTOR
William A. Sapp
BY
Attorney

UNITED STATES PATENT OFFICE.

WILLIAM A. SAPP, OF ELGIN, NEBRASKA.

DIRIGIBLE LIGHT-SUPPORT.

1,029,514.   Specification of Letters Patent.   Patented June 11, 1912.

Application filed September 7, 1911. Serial No. 648,086.

*To all whom it may concern:*

Be it known that I, WILLIAM A. SAPP, a citizen of the United States, residing at Elgin, in the county of Antelope and State of Nebraska, have invented certain new and useful Improvements in Dirigible Light-Supports, of which the following is a specification.

This invention relates to improvements in dirigible automobile lamp brackets and an object thereof is to provide a bracket by the use of which the rays from the lamp will be thrown in the direction in which the automobile is being steered, and which bracket is constructed with a view to providing convenient adjusting means therefor.

A further object of the invention is to provide a bracket which may be easily attached to all standard makes of automobiles, and which will be inexpensive to manufacture and will give efficient service.

For a full understanding of the present invention, reference is to be had to the following description and to the accompanying drawings, in which—

Figure 1 is a perspective view of the invention. Fig. 2 is a section illustrating the adjustable feature of the lamp carrying arms. Fig. 3 is a plan view of the shifting arm.

Throughout the following detail description and on the several figures of the drawings, similar parts are referred to by like reference characters.

Referring to the drawings, 1 and 2 denote the lamp carrying arms which are adjustably connected to receive lamps of different sizes, said connections being more fully described hereinafter. The horizontal portion 3 of the arm 1 has provided thereon a hub 4 projecting downwardly and also a shallow groove 5 in the upper side thereof. Slidably mounted in said groove is a slotted end portion 6 of the arm 2, and the slot 7 thereof registers with a bolt receiving opening 8 in the hub 4. The shifting arm 9 is loosely received by an opening 10 in the hub 4 and laterally extending therefrom is a slotted extension 11, the slot in said extension being received by a lug 12 projecting downwardly from the under side of the horizontal portion of the arm 2.

A vertical portion 13 of a supporting bracket 14 is adapted to be adjustably secured to the side bar of the automobile by means of clamping elements 15, and said bracket is provided with an enlargement 17 on the extremity of the horizontal extension 16. The hub 4 of the lamp carrying arm is rotatably mounted in the opening 18 of the enlarged portion 17 of the supporting bracket and the parts so assembled are retained in place by the bolt 19 and a washer 20' thereon. A nut 21' is received on the end of the bolt 19.

The shifting mechanism for the lamp is directly connected to the steering mechanism of the automobile and thus it will be seen that the light will always be thrown in the direction in which the automobile is being steered, as when rounding a curve in the road.

The steering bracket 20, which is adjustably carried by the steering rod of the machine, has a horizontal portion 21 and the length of said portion 21 is variable by means of a slot and bolt connection in order to accommodate for its use on different sized machines, and position the upper portion 22 to properly engage the slot 23 of the shifting arm 9.

It will be seen that the peculiar mounting of the lamp brackets in this invention is of an advantageous nature and the connection between the lamp carrying arms, which is held in adjusted position by the bolt 19, affords an exceedingly practical and economical construction. When it is desired to adjust the position of the lamp, this may be readily done by moving the shifting bracket 20 on the steering rod. The bracket 20 also has a forwardly extending portion 23 which will accommodate for the lamp bracket to be attached to the frame of the machine far enough forwardly to give ample room for operation of the starting crank.

Having thus described the invention, what is claimed as new is:

A bracket for automobile lamps comprising adjustably connected lamp carrying arms, a shifting arm having a lateral slotted extension, a lug projecting from one of said arms and coöperating with said slotted extension, a supporting bracket for the lamp carrying arms, and means for actuating said shifting arm.

In testimony whereof I affix my signature in presence of two witnesses.

WILLIAM A. SAPP.

Witnesses:
EARL O. MARTIN,
J. F. ARMSTRONG.

Copies of this patent may be obtained for five cents each, by addressing the "Commissioner of Patents, Washington, D. C."